(12) United States Patent
Noguchi et al.

(10) Patent No.: US 8,843,257 B2
(45) Date of Patent: Sep. 23, 2014

(54) FUEL CELL VEHICLE

(75) Inventors: Minoru Noguchi, Wako (JP); Takeshi Fujino, Wako (JP); Eisuke Komazawa, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 616 days.

(21) Appl. No.: 12/385,397

(22) Filed: Apr. 7, 2009

(65) Prior Publication Data

US 2009/0254234 A1    Oct. 8, 2009

(30) Foreign Application Priority Data

Apr. 7, 2008    (JP) ................................. 2008-099448

(51) Int. Cl.
*B60L 11/18*    (2006.01)
(52) U.S. Cl.
CPC ......... *B60L 11/1881* (2013.01); *B60L 11/1892* (2013.01); *Y02T 90/34* (2013.01)
USPC ........................................... 701/22; 701/123
(58) Field of Classification Search
USPC .......................................... 701/22, 123, 208
See application file for complete search history.

(56) References Cited

U.S. PATENT DOCUMENTS

| | | | | |
|---|---|---|---|---|
| 5,916,298 | A * | 6/1999 | Kroiss et al. ................... | 701/123 |
| 6,826,460 | B2 * | 11/2004 | Kittell et al. ..................... | 701/22 |
| 7,143,363 | B1 * | 11/2006 | Gaynor et al. ................. | 715/771 |
| 7,853,403 | B2 * | 12/2010 | Tanaka ........................... | 701/209 |
| 7,945,797 | B2 * | 5/2011 | Matton et al. | |
| 2004/0062963 | A1 * | 4/2004 | Umayahara et al. ............ | 429/22 |
| 2009/0254234 | A1 * | 10/2009 | Noguchi et al. ................ | 701/22 |
| 2009/0271056 | A1 * | 10/2009 | Kitanaka ......................... | 701/22 |
| 2010/0106351 | A1 * | 4/2010 | Hanssen et al. ................. | 701/22 |
| 2010/0169008 | A1 * | 7/2010 | Niwa et al. ..................... | 701/208 |
| 2010/0194553 | A1 * | 8/2010 | Mizutani et al. .............. | 340/438 |
| 2010/0207755 | A1 * | 8/2010 | Watson et al. ............. | 340/450.2 |
| 2010/0253529 | A1 * | 10/2010 | Umayahara .................... | 340/632 |
| 2010/0277495 | A1 * | 11/2010 | Taguchi et al. ................ | 345/589 |
| 2011/0156642 | A1 * | 6/2011 | Noguchi et al. ................ | 320/109 |
| 2011/0213520 | A1 * | 9/2011 | Yaguchi et al. ................. | 701/22 |
| 2011/0270480 | A1 * | 11/2011 | Ishibashi et al. ............... | 701/22 |
| 2012/0303397 | A1 * | 11/2012 | Prosser ........................ | 705/7.12 |
| 2013/0127475 | A1 * | 5/2013 | Sitarski et al. ................ | 324/435 |

FOREIGN PATENT DOCUMENTS

| | | |
|---|---|---|
| JP | 2001-069614 | 3/2001 |
| JP | 2003-252525 | 9/2003 |
| JP | 2003-262525 | 9/2003 |
| JP | 2004-290000 | 10/2004 |
| JP | 2007-059415 | 3/2007 |

OTHER PUBLICATIONS

JP Office Action, dated Jan. 10, 2012; Issued on Priority Claimed Japanese Application No. 2008-09948.

* cited by examiner

*Primary Examiner* — John Q Nguyen
*Assistant Examiner* — Michael Whalen
(74) *Attorney, Agent, or Firm* — Squire Patton Boggs (US) LLP (57) ABSTRACT

The present invention provides a fuel cell vehicle capable of displaying information with high usability to a driver or the like in view of appropriately planning a task related to the fuel cell vehicle. A second indicator ($I_2$) displays an available electric power supply of a fuel cell (11), a capacitor (12) and a second cell (16), respectively. A third indicator ($I_3$) displays a remained fuel amount. A fourth indicator ($I_4$) displays a charge amount of the capacitor (12) and the second cell (16), respectively.

10 Claims, 4 Drawing Sheets

FUEL CELL VEHICLE

CROSS REFERENCE TO RELATED APPLICATIONS

The present application is based on and claims the priority benefit of Japanese Patent Application 2008-099448 filed on Apr. 7, 2008, the contents of which are incorporated herein by reference in its entirety.

BACKGROUND OF THE INVENTION

1. Field of the Invention

The present invention relates to a fuel cell vehicle mounted with a fuel cell served as a driving power source.

2. Description of the Related Art

For a fuel cell vehicle mounted with a fuel cell served as a driving power source, in order to notify a driver of the fuel cell vehicle about a status of a power source such as the fuel cell, a motor and the like, there has been disclosed a technology which displays a regeneration status of the motor, an output status of the fuel cell or the like in Japanese Patent Laid-open No. 2004-290000. Moreover, another technology which notifies a driver that an available output from an energy source such as a fuel cell, a second cell or the like is in a power insufficient status has been disclosed in Japanese Patent Laid-open No. 2007-059415.

However, displaying only the status of the power source will not help a driver or a user of the vehicle in appropriately planning a task such as continuation of driving the vehicle, fuel supplement to the vehicle, power supply to an outer apparatus from the vehicle, or the like.

SUMMARY OF THE INVENTION

The present invention has been accomplished in view of the aforementioned problems, and it is therefore an object of the present invention to provide a fuel cell vehicle capable of displaying information with high usability to a driver or the like in view of appropriately planning a task related to the fuel cell vehicle.

A fuel cell vehicle of a first aspect of the present invention is provided with a fuel cell, an electric accumulator, a motor for driving the fuel cell vehicle, and a motor controlling device configured to control the motor by adjusting an electric power supplied to the motor by the fuel cell and the electric accumulator, respectively, and includes: a first recognition element configured to recognize a first electric power index value representing an available electric power supply of one or both of the fuel cell and the electric accumulator; a second recognition element configured to recognize a first distance index value representing an available driving distance of the vehicle according to the first electric power index value; and an information output device configured to output the first distance index value, or the first distance index value and the first electric power index value.

According to the fuel cell vehicle (hereinafter, referred to as "vehicle" where appropriate) of the first aspect of the present invention, the first distance index value representing an available driving distance of the vehicle, or the first distance index value and the first electric power index value representing an available electric power supply of one or both of the fuel cell and the electric accumulator (hereinafter, referred to as "fuel cell and the like") are output. The first distance index value is a numerical datum defined according to the first electric power index value. "Outputting information by an information output device" means that the information is output in a form recognizable for a driver or the like of the vehicle through five senses thereof such as eyesight, hearing, touch and the like.

According thereto, the available driving distance of the vehicle, or the available driving distance of the vehicle and the available electric power supply of the fuel cell and the like can be recognized by the driver or the like as the information with high usability for appropriately planning a task such as continuation of driving the vehicle to a desired position in view of the available electric power supply of the fuel cell and the like as the driving power source.

Note that "a component of the fuel cell vehicle recognizes information" means that the component performs a possible information processing on a piece of information to prepare the information ready for a further information processing, such as searching the information in a database, retrieving the information from a memory device such as a memory card or the like, receiving the information, inputting the information, measuring, calculating, estimating or determining the information according to a piece of searched or received basic information or an output signal from a sensor or the like, storing the obtained information in a memory or the like.

A second aspect of the fuel cell vehicle is dependent on the first aspect of the present invention, and further includes a position recognition element configured to recognize a present position of the vehicle as a first position and a position of a fuel supply station for the fuel cell as a second position, wherein the second recognition element recognizes a second distance index value representing a required driving distance for the vehicle to drive from the first position to the second position according to a recognition result obtained by the position recognition element, and the second distance index value is output by the information output device.

According to the fuel cell vehicle of the second aspect of the present invention, the second distance index value representing the required driving distance for the vehicle to drive from the present position thereof (the first position) to the position of the fuel supply station (the second position) is output. Thereby, the required driving distance can be recognized by the driver or the like as the information with high usability for planning a task such as refilling fuels in the fuel supply station or the like.

A third aspect of the fuel cell vehicle is dependent on the second aspect of the present invention, wherein the first recognition element recognizes a second electric power index value representing an available electric power supply of the fuel cell vehicle to an outer apparatus according to the first electric power value and a difference between the first distance index value and the second distance index value, and the second electric power index value is output by the information output device.

According to the fuel cell vehicle of the third aspect of the present invention, the second electric power index value representing an available electric power supply of the fuel cell vehicle to an outer apparatus nearby is output. The second electric power index value is a numerical datum recognized according to the difference between the first distance index value representing an available driving distance of the vehicle and the second distance index value representing a required driving distance for the vehicle to drive from the present position (the first position) to the position of a fuel supply station (the second position). Thereby, whether the vehicle has surplus electric power to be supplied or how much electric power can be supplied to an outer apparatus nearby can be recognized by the driver or the like as the information with high usability for planning a task such as supplying electric power to the outer apparatus from the vehicle and driving the vehicle to the coming fuel supply station.

A fourth aspect of the fuel cell vehicle is dependent on the third aspect of the present invention, wherein the first recognition element recognizes a fourth electric power index value representing a requested electric power supply by the outer apparatus, and the fourth electric power index value or a difference between the second electric power index value and the fourth electric power index value is output by the information output device.

According to the fuel cell vehicle of the fourth aspect of the present invention, the fourth electric power index value representing a requested electric power supply by the outer apparatus or a difference between the second electric power index value representing an available electric power supply of the fuel cell vehicle to an outer apparatus and the fourth electric power index value is output. Thereby, how much electric power is requested by an outer apparatus or the like can be recognized by the driver or the like as the information with high usability for planning a task such as supplying electric power to the outer apparatus from the vehicle.

A fifth aspect of fuel cell vehicle is dependent on the first aspect of the present invention, and further includes a position recognition element configured to recognize a present position of the vehicle as a first position, a position of a fuel supply station for the fuel cell as a second position and a position of an outer apparatus as a third position, wherein the second recognition element recognizes a third distance index value representing a required driving distance for the vehicle to drive from the first position to the second position through the intermediary of the third position according to a recognition result obtained by the position recognition element, the first recognition element recognizes a third electric power index value representing an available electric power supply of the fuel cell vehicle to the outer apparatus according to the first electric power index value, or the first distance index value and the third distance index value, and the third electric power index value, or the third electric power index value and the third distance index value are output by the information output device.

According to the fuel cell vehicle of the fifth aspect of the present invention, the third electric power index value representing an available electric power supply of the fuel cell vehicle to an outer apparatus distant from the vehicle is output. The third electric power index value is a numerical datum determined according to the first electric power index value representing an available electric power supply of the fuel cell and the like, or a difference between the first distance index value representing an available driving distance of the vehicle and the third distance index value representing a required driving distance for the vehicle to drive from the present position (the first position) to the position of a fuel supply station (the second position) through the intermediary of the position of an outer apparatus (the third position). Thereby, whether the vehicle has surplus electric power to be supplied or how much electric power can be supplied to an outer apparatus distant from the vehicle can be recognized by the driver or the like as the information with high usability for planning a task such as driving the vehicle to the position of the outer apparatus, supplying electric power to the outer apparatus from the vehicle and driving the vehicle to the coming fuel supply station.

A sixth aspect of fuel cell vehicle is dependent on the fifth aspect of the present invention, wherein the first recognition element recognizes a fourth electric power index value representing a requested electric power supply by the outer apparatus, and the fourth electric power index value or a difference between the third electric power index value and the fourth electric power index value is output by the information output device.

According to the fuel cell vehicle of the sixth aspect of the present invention, the fourth electric power index value representing a requested electric power supply by the outer apparatus or the difference between the third electric power index value representing an available electric power supply of the fuel cell vehicle to the outer apparatus and the fourth electric power index value is output. Thereby, how much electric power has been requested by an outer apparatus or the like can be recognized by the driver or the like as the information with high usability for planning a task such as supplying electric power to the outer apparatus from the vehicle or the like.

A seventh aspect of fuel cell vehicle is dependent on the first aspect of the present invention, wherein the first recognition element recognizes a fifth electric power index value representing a total amount of electric power supply from the fuel cell vehicle to the outer apparatus according to a variation in the first electric power index value, and the fifth electric power index value is output by the information output device.

According to the fuel cell vehicle of the seventh aspect of the present invention, the fifth electric power index value representing a total amount of electric power supply from the fuel cell vehicle to the outer apparatus is output. Thereby, how much electric power has been supplied totally to an outer apparatus from the vehicle can be recognized by the driver or the like as the information with high usability for planning a task such as continuing to supply electric power to the outer apparatus from the vehicle or stopping it.

An eighth aspect of fuel cell vehicle is dependent on the first aspect of the present invention, wherein the first recognition element recognizes a remained fuel amount in a fuel tank mounted in the fuel cell vehicle as the first electric power index value of the fuel cell.

According to the fuel cell vehicle of the eighth aspect of the present invention, the remained fuel amount in the fuel tank mounted in the vehicle can be recognized by the driver or the like as the information with high usability for planning a task such as refilling fuels or the like.

A ninth aspect of fuel cell vehicle is dependent on the first aspect of the present invention, wherein the first recognition element recognizes a charge amount of the electric accumulator (meaning how much the electric accumulator has been charged) as the first electric power index value of the electric accumulator.

According to the fuel cell vehicle of the ninth aspect of the present invention, the charge amount of the electric accumulator mounted in the vehicle can be recognized by the driver or the like as the information with high usability for planning a task such as refilling fuels or the like.

DETAILED DESCRIPTION OF THE PREFERRED EMBODIMENTS

Hereinafter, an embodiment of a fuel cell vehicle according to the present invention will be described with reference to the drawings.

Figure 1:
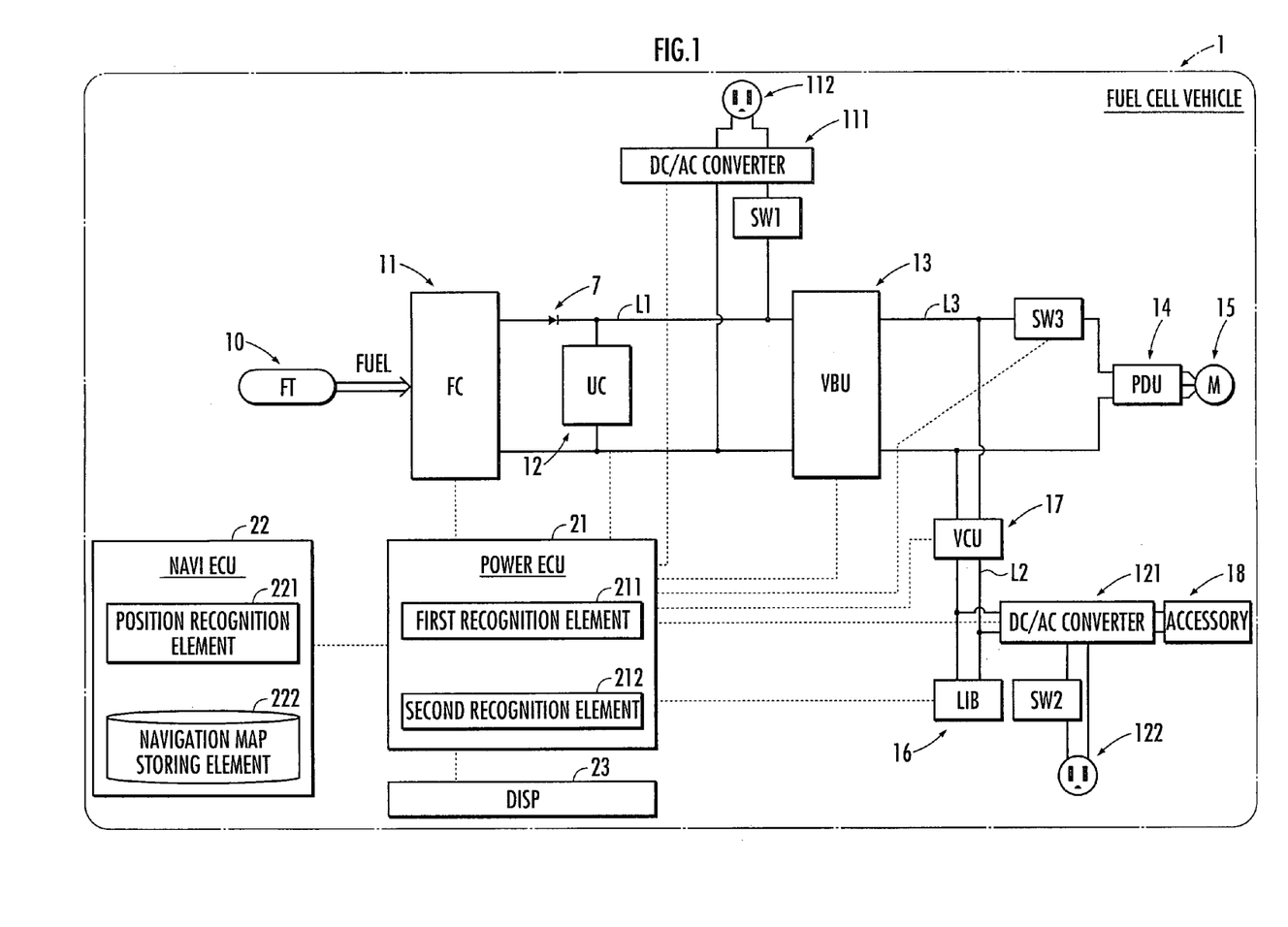
FIG. 1 is a block diagram illustrating a configuration of a fuel cell vehicle of the present invention.

As illustrated in FIG. 1, the fuel cell vehicle 1 is provided with a fuel tank (FT) 10, a fuel cell (FC) 11, a capacitor (first electric accumulator (UC)) 12, a voltage boosting unit (VBU) 13, a motor-driving unit (power driving unit (PDU)) 14, a motor (M) 15, a storage cell (second electric accumulator (LIB)) 16, a voltage converting unit (VCU) 17 and an accessory 18.

The fuel cell 11 is constituted by connecting a plurality of fuel cell stacks in series, and has an output voltage varying in a range, for example, from 225V (output current 0 A) to 180V (output current 210 A).

The capacitor 12 is an electrically 2-layered capacitor and has an output voltage varying in a range, for example, from 154V to 243V around 200V. A diode 7 is disposed between the fuel cell 11 and the capacitor 12 and the voltage boosting unit 13 to prevent a current from flowing into the fuel cell 11. Note that it is acceptable to prevent the current from flowing into the fuel cell 11 by using a rectifying element such as a transistor or the like in replace of the diode 7, or by connecting the capacitor 12 to the fuel cell 11 through the intermediary of a voltage step-down unit (down converter).

The voltage boosting unit 13 is, for example, a DC/DC converter with a rated power of 100 kW and a voltage boosting ratio of 1.5 to 2.4, having a voltage boosting function or voltage boosting and voltage step-down functions. An input portion of the voltage boosting unit 13 is connected in parallel with the fuel cell 11 and the capacitor 12, and an output portion thereof is connected in parallel with the motor 15 through the intermediary of the motor-driving unit 14 and the storage cell 16 through the intermediary of the voltage converting unit 17.

An electric power is output from the fuel cell 11 and the capacitor 12 and is supplied to the motor 15 after being boosted by the voltage boosting unit 13. By adjusting the electric power supplied to the motor 15, the motor-driving unit 14 controls the operation of the motor 15. Moreover, the motor-driving unit 14, by controlling the operation of the voltage converting unit 17, controls the electric power supplied to the motor 15 from the storage cell 16 through the intermediary of the voltage converting unit 17 and the electric power supplied to the storage cell 16 from the voltage boosting unit 13 through the intermediary of the voltage converting unit 17.

The storage cell 16 is, for example, a lithium cell having an output voltage varying in a range from 290V to 350V.

The voltage converting unit 17 is, for example, a DC/DC converter with a rated power of 10 kW and a voltage boosting ratio of 1.36 to 1.70.

The accessory 18 is disposed between the storage cell 16 and the voltage converting unit 17, connected in parallel with the storage cell 16. The accessory 18 contains an air pump for supplying fuels such as hydrogen gas, air and the like from the fuel tank 10 to the fuel cell 11, a water pump for supplying circulation water to cool the fuel cell 11, a humidifier, a fuel cell heater, an air conditioner and the like.

The vehicle 1 includes a first electric power supply portion 112 and a second electric power supply portion 122. Either of the two electric power supply portions is composed of an outlet. An outer apparatus obtains electric power from either of the two electric power supply portions through a plug inserted into the outlet.

The first electric power supply portion 112 is disposed between the capacitor 12 and the voltage boosting unit 13, connected in parallel with the fuel cell 11 and the capacitor 12 through the intermediary of a first DC/AC converter 111. A first switch SW1 is disposed between the first DC/AC converter 111 and a first line L1 for transmitting the electric power supplied from the fuel cell 11 and the capacitor 12, respectively. The connection between the first electric power supply portion 112 and the fuel cell 11 and the capacitor 12 is switched on or off by the first switch SW1.

The second electric power supply portion 122 is disposed between the storage cell 16 and the voltage converting unit 17, connected in parallel with the storage cell 16 through the intermediary of a second DC/AC converter 121. A second switch SW2 is disposed between the second DC/AC converter 121 and a second line L2 for transmitting the electric power supplied from the storage cell 16. The connection between the second electric power supply portion 122 and the storage cell 16 is switched on or off by the second switch SW2. The electric power from the storage cell 16 is regulated into one of a low voltage (DC 12 v, for example) by a voltage regulator (not shown), and thereafter, the regulated electric power is supplied to an outer apparatus, such as a television, a radio, a lighting device or the like, through the second electric power supply portion 122.

A third switch SW3 is disposed at a third line L3 to switch on or off the voltage boosting unit 13 and the motor 15. The third line L3 is connected to the first line L1 through the intermediary of the voltage boosting unit 13. The switch SW3 is controlled by a first electronic controlling unit 21 (to be described hereinafter) to switch on or off in conjunction to the first switch SW1 and the second switch SW2.

Note that it is acceptable to dispose the first electric power supply portion 112 between the voltage boosting unit 13 and the third switch SW3, connected in parallel with the voltage boosting unit 13. According thereto, the electric power of a high voltage transmitted from the third line L3 is supplied to an electric automobile needing a large electric power or an outer apparatus such as another fuel cell vehicle for charging a fuel cell thereof from the first electric power supply portion 112. Moreover, it is acceptable to dispose the second electric power supply portion 122 between the voltage boosting unit 13 and the third switch SW3, connected in parallel with the voltage boosting unit 13. According thereto, the electric power of a high voltage transmitted from the third line L3 can be supplied from the second electric power supply portion 122 to an outer apparatus needing a large electric power of a high voltage equivalent to or higher than that supplied by the first electric power supply portion 112.

In addition to the first electronic controlling unit (POWER ECU) 21 mentioned above, the vehicle 1 further includes a second electronic controlling unit (NAVI ECU) 22 and a display unit (information outputting unit (DISP)) 23.

The first electronic controlling unit 21 and the second electronic controlling unit 22 are both composed of a CPU, a ROM, a RAM, an I/O, an A/D conversion circuit and the like. Note that it is acceptable that the first electronic controlling unit 21 and the second electronic controlling unit 22 are made of a single electronic controlling unit.

The first electronic controlling unit 21 controls the electric power supplied from each of the fuel cell 11, the capacitor 12 and the storage cell 16 to an outer apparatus through the first electric power supply portion 112 and a state of charge (SOC) of each of the capacitor 12 and the storage cell 16 which are charged by the electric power from the fuel cell 11, by controlling operations of the fuel cell 11, the voltage boosting unit 13, the voltage conversion unit 17, the DC/AC converter 111 and the like on the basis of an output from the fuel cell 11, the state of charge of the capacitor 12 and the storage cell 16, respectively. The first electronic controlling unit 21 is composed of a first recognition element 211 and a second recognition element 212, which are configured to recognize various index values, respectively.

The second electronic controlling unit 22 is composed of a navigation unit and is provided with a position recognition element 221 and a navigation map storing element 222. The position recognition element 221 recognizes a position or the like of the vehicle 1. The navigation map storing element 222 stores navigation map information indicating a position of a fuel supply station, a layout of roads or the like. The display unit 23 is disposed in an instrumental panel or a center console, and is configured to display thereon the index values recognized by the first recognition element 211 and the second recognition element 212, respectively. Note that it is acceptable that the display unit 23 is formed from a navigation display unit which is a constituent element of the navigation unit and is configured to display thereon a piece of navigation information, a recommended route for the vehicle 1 and the like.

Hereinafter, descriptions will be carried out on functions of the vehicle 1 having the above-mentioned configuration. First, the first recognition element 211 recognizes a first electric power index value $E_1$ representing an available electric power supply of each of the fuel cell 11, the capacitor 12 and the storage cell 16 (FIG. 2/S002).

Specifically, an output signal corresponding to a remained fuel amount in the fuel tank 10 sent from a sensor (not shown) is input to the first electronic controlling unit 21 as an input signal. On the basis of the input signal, the first recognition element 211 calculates or determines an available electric power supply of the fuel cell 11 or an increasing function thereof as the first electric power index value $E_1$ according to a first calculation formula or a first chart (stored in a memory unit). Moreover, an output signal corresponding to a current and a voltage of the capacitor 12 and the storage cell 16, respectively, sent from a sensor (not shown) is input to the first electronic controlling unit 21 as an input signal. On the basis of the input signal, the first recognition element 211 calculates or determines an available electric power supply of the capacitor 12 and the storage cell 16, respectively, or the SOC thereof according to a second calculation formula or a second chart (stored in the memory unit).

Figure 2:
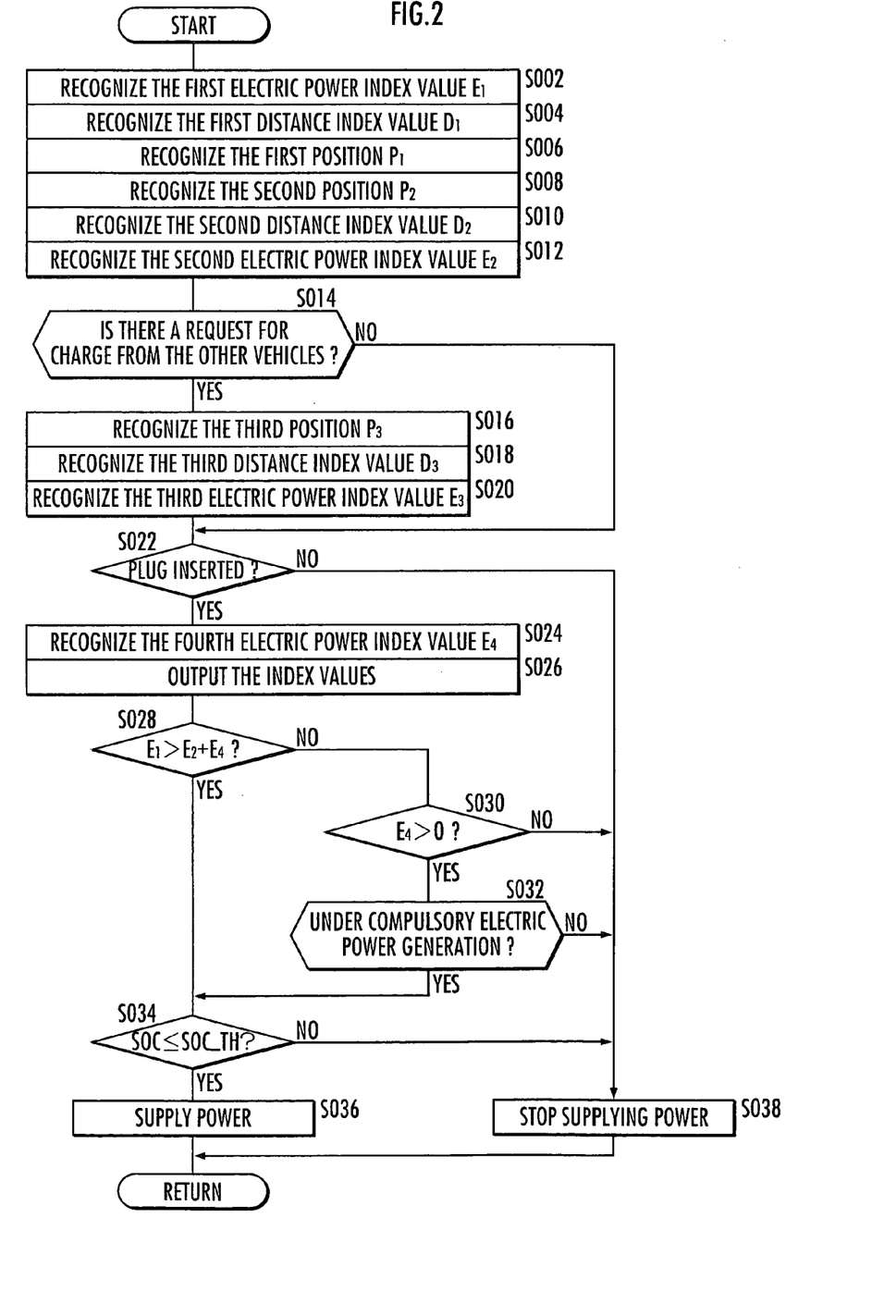
FIG. 2 is a flow chart illustrating functions of the vehicle of the present invention.

Next, on the basis of the first electric power index value $E_1$, the second recognition element 212 recognizes a first distance index value $D_1$ representing an available driving distance of the vehicle 1 (FIG. 2/S004). The greater the first electric power index value $E_1$ is, the greater the first distance index value $D_1$ will be calculated or evaluated continuously or discontinuously as an available driving distance of the vehicle 1 or an increasing function thereof.

Thereafter, the position recognition element 221 recognizes a present position of the vehicle 1 as a first position $P_1$ (FIG. 2/S006). Specifically, the first position $P_1$ is sequentially determined on the basis of a GPS signal received from a satellite by a GPS receiver, or an output signal from an acceleration sensor or a gyro sensor mounted in the vehicle 1 (refer to FIG. 4). The position is represented by a coordinate system defined by longitude and latitude, or by longitude, latitude and altitude.

Subsequently, the position recognition element 221 recognizes a position of a fuel supply station as a second position $P_2$ (FIG. 2/S008). Specifically, a coordinate of a fuel supply station contained in the navigation information stored in the navigation storing element 222 is retrieved as the second position $P_2$ (refer to FIG. 4). It is acceptable to retrieve a position of a fuel supply station which is closet to the vehicle 1 as the second position $P_2$. It is also acceptable to retrieve positions of a plurality of fuel supply station having a distance to the vehicle limited in a predefined rank as the second position $P_2$. Furthermore, it is acceptable to retrieve positions of one or a plurality of fuel supply stations available in a region expanded with the vehicle 1 as the reference as the second position $P_2$.

Figure 4:
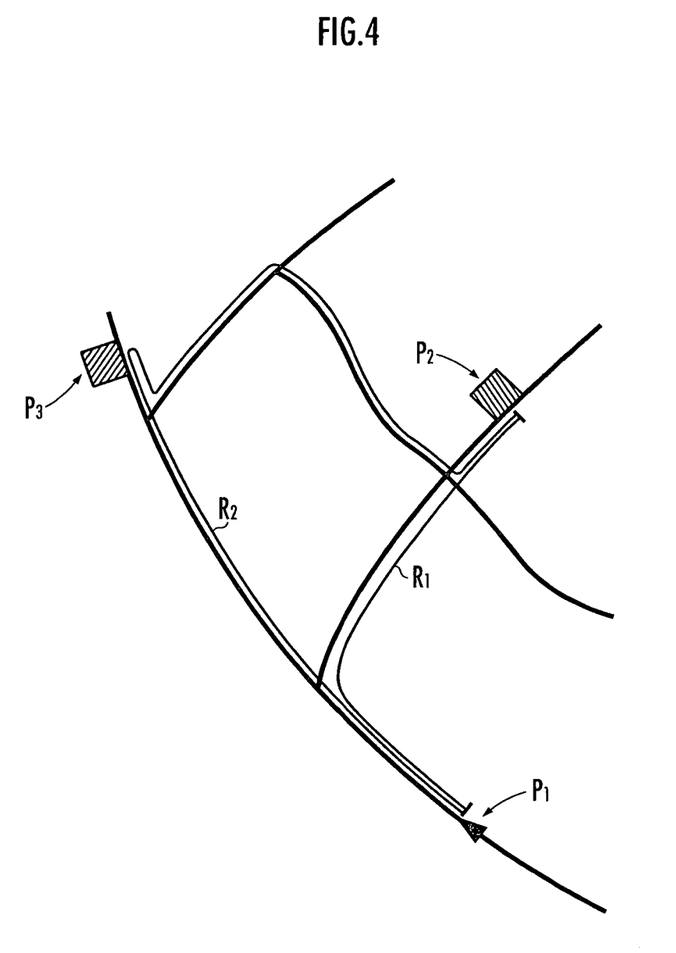
FIG. 4 is an explanatory diagram illustrating a plan for performing a task.

Thereafter, the second recognition element 212 recognizes a second distance index value $D_2$ representing a required driving distance for the vehicle 1 to drive from the first position $P_1$ to the second position $P_2$ (FIG. 2/S010). Specifically, as illustrated in FIG. 4, a first route $R_1$ joining the first position $P_1$ and the second position $P_2$ is defined by the second electronic controlling unit 22, and a length of the first route $R_1$ or an increasing function thereof is calculated by the second recognition 212 as the second distance index value $D_2$. In addition, when a fuel supply station (specifically, a terminal device having a communication function, such as a computer disposed in the fuel supply station) transmits an information signal representing a required driving distance for the vehicle 1 to drive from the first position $P_1$ to the second position $P_2$, the information signal is received by a communication device mounted in the vehicle 1. Thereafter, it is acceptable that the second recognition element 212 recognizes the received information as the second distance index value $D_2$ or recognizes it as the second distance index value $D_2$ after a computation processing.

Next, the first recognition element 211 recognizes a second electric power index value $E_2$ representing an available electric power supply from the vehicle 1 to an outer apparatus on the basis of the first electric power index value $E_1$ and a difference ($=D_1-D_2$) between the first distance index value $D_1$ and the second distance index value $D_2$ (FIG. 2/S012). The greater the first electric power index value $E_1$ or the difference ($=D_1-D_2$) is, the greater the second electric power index value $E_2$ will be calculated or evaluated continuously or discontinuously.

Further, whether there is a request for charging from another vehicle (outer apparatus) is determined by the position recognition element 221 (FIG. 2/S014). Specifically, the position recognition element 221 determines whether a communication device constituting the first electronic controlling unit 21 or connected to the first electronic controlling unit 21 has received a request for charging directly from another vehicle or indirectly from the other vehicle through a server.

If it is determined that there has been a request for charging (FIG. 2/S014 . . . YES), the position of the other vehicle is recognized as a third position $P_3$ (FIG. 2/S016). For example, a signal representing a present position of the other vehicle determined by a device (if the other vehicle is a fuel cell vehicle with the same configuration as the vehicle 1, the device is the position recognition element 221) mounted in the other vehicle is received by the communication device together with the request signal for charging, and according thereto, the third position $P_3$ is recognized.

Thereafter, the second recognition element 212 recognizes a third distance index value $D_3$ representing a required driving distance for the vehicle 1 to drive from the first position $P_1$ to the second position $P_2$ through the intermediary of the third position $P_3$ (FIG. 2/S018). Specifically, as illustrated in FIG. 4, the second electronic controlling unit 22 defines a second route $R_2$ joining the first position $P_1$ and the second position $P_2$ through the third position $P_3$ on the basis of the navigation map, and calculates a length of the second route $R_2$ or an increasing function thereof as the third distance index value $D_3$.

Subsequently, the first recognition element 211 recognizes a third electric power index value $E_3$ representing an available electric power supply from the vehicle 1 to an outer apparatus on the basis of the first electric power index value $E_1$ or the first distance index value $D_1$ and the third distance index value $D_3$ (FIG. 2/S020). The greater the first electric power index value $E_1$ or the first distance index value $D_1$ is, or the smaller the third distance index value $D_3$ is, the greater the third electric power index value $E_3$ will be calculated or evaluated continuously or discontinuously.

In addition, whether a plug is present in the first electric power supply portion 112, in other words, the plug being connected to a battery or a capacitor mounted in the other vehicle has been inserted into the first electric power supply portion 112 is determined (FIG. 2/S022). Whether a plug is present or not will be determined (FIG. 2/S022) immediately after the determination result that there is not a request for charging (FIG. 2/S014 . . . NO).

If a plug is determined to be present in the first electric power supply portion 112 (FIG. 2/S022 . . . YES), the first recognition 211 recognizes a fourth electric power index value $E_4$ representing a requested electric power supply by the other vehicle (outer apparatus) (FIG. 2/S024).

Specifically, if the other vehicle is a fuel cell vehicle having the same configuration as the vehicle 1, a deficiency of the available electric power supply of the other vehicle in comparison with the required electric power for the other vehicle to drive from the present position thereof to a fuel supply station, or an increasing function thereof is calculated as the fourth electric power index value $E_4$. For example, when the other vehicle is a fuel cell vehicle having the same configuration as the vehicle 1, a deficiency of the first electric power index value $E_1$ compared with the calculated second electric power index value $E_2$ is calculated for the other vehicle. After the deficiency has been recognized by the first electronic controlling unit 21 of the vehicle 1 through communication with the other vehicle, the fourth electric power index value $E_4$ is calculated or evaluated in correspondence to the deficiency. The greater the deficiency is, the greater the fourth electric power index value $E_4$ will be calculated or evaluated. Further, after the first electric power index value $E_1$ of the other vehicle has been recognized by the first electronic controlling unit 21 of the vehicle 1 through communication with the other vehicle, the fourth electric power index value $E_4$ is calculated or evaluated in correspondence to the deficiency of the first electric power index value $E_1$ of the other vehicle in comparison with the second electric power index value $E_2$ of the vehicle 1. The greater the deficiency is, the greater the fourth electric power index value $E_4$ will be calculated or evaluated.

Thereafter, a part or a total of the aforementioned index values are displayed on the display unit 23 (FIG. 2/S026).

Figure 3:
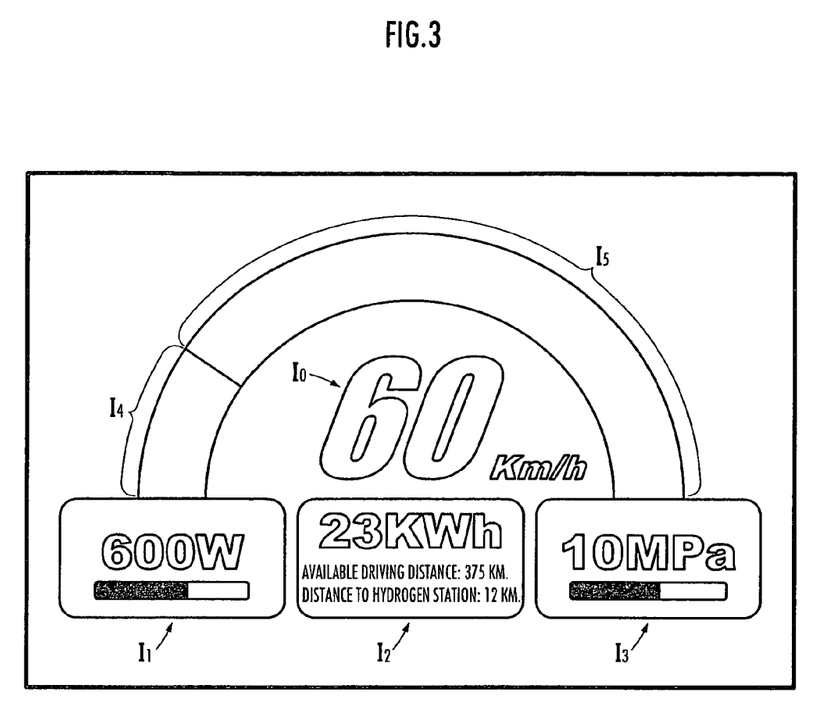
FIG. 3 is an explanatory diagram with index values displayed thereon.

For example, as illustrated in FIG. 3, a velocity indicator $I_0$, a first indicator $I_1$, a second indicator $I_2$, a third indicator $I_3$, a fourth indicator $I_4$ and a fifth indicator $I_5$ are graphically displayed on the display unit 23. Herein, the velocity indicator $I_0$ displays a vehicular velocity v; the first indicator $I_1$ displays the electric power being supplied to an outer apparatus; the second indicator $I_2$ displays the available electric power supply of the vehicle 1 (the first electric power index value $E_1$), the available driving distance (the first distance index value $D_1$) and the required driving distance to a fuel supply station (the second distance index value $D_2$); the third indicator $I_3$ displays the remained fuel amount (the first electric power index value $E_1$ of the fuel cell 11); the fourth indicator $I_4$ displays the charge amount of the capacitor 12 and the storage cell 16, respectively; and the fifth indicator $I_5$ displays a discharged level of the fuel cell 11.

The design (such as color or the like) of each indicator may be contrived to vary according to the greatness of the first electric power index value $E_1$ or the second electric power index value $E_2$. For example, when the electric power index value $E_1$ or the second electric power index value $E_2$ is high, the color thereof may be designed as "blue"; when the electric power index value $E_1$ or the second electric power index value $E_2$ is medium, the color thereof may be designed as "yellow"; and when the electric power index value $E_1$ or the second electric power index value $E_2$ is low, the color thereof may be designed as "reddish". It is also acceptable to contrive the color of a part of or the whole indicators. In addition to the example illustrated in FIG. 3, it is acceptable to display thereon the index values in a combination in various ways.

Whether the first electric power index value $E_1$ is greater than a sum of the second electric power index value $E_2$ and the fourth electric power index value $E_4$ (FIG. 2/S028). When it is determined that the first electric power index value $E_1$ is greater than the sum of the second electric power index value $E_2$ and the fourth electric power index value $E_4$ (FIG. 2/S028 . . . YES), whether an SOC of an electric accumulator mounted in the other vehicle is equal to or smaller than a threshold value SOC_TH is determined (FIG. 2/S034). Note that this determination processing is not obligatory.

When it is determined that the SOC of the electric accumulator mounted in the other vehicle is equal to or smaller than a threshold value SOC_TH (FIG. 2/S034 . . . YES), the electric power is supplied from the vehicle 1 to the other vehicle through the first electric power supply portion 112 (FIG. 2/S036). Accordingly, the electric accumulator mounted in the other vehicle is charged gradually. Note that the electric power may be supplied from the vehicle 1 to an outer apparatus such as a computer or a hot plate through the second electric power supply portion 122 in place of or in addition to the first electric power supply portion 112.

When it is determined that the SOC of the electric accumulator mounted in the other vehicle is greater than the threshold value SOC_TH (FIG. 2/S034 . . . NO), the electric power supply to the other vehicle from the vehicle 1 is not performed or will be stopped (FIG. 2/S038). Note that the greatness of the index values is not limited to be recognized graphically by the driver or the like through eyesight sense; it is acceptable for it to be recognized in the form of a sound by the driver or the like through hearing sense or in the form of vibration by the driver or the like through touch sense.

On the other hand, when it is determined that the first electric power index value $E_1$ is not greater than a sum of the second electric power index value $E_2$ and the fourth electric power index value $E_4$ (FIG. 2/S028 . . . NO), whether the fourth electric power index value $E_4$ is greater than 0 is determined (FIG. 2/S030). When it is determined that the fourth electric power index value $E_4$ is greater than 0 (FIG. 2/S030 . . . YES), whether the fuel cell 11 is under compulsory electric power generation, in other words, in a state of outputting a greater electric power with high voltage than usual, is determined (FIG. 2/S032). When it is determined that the fuel cell 11 is under compulsory electric power generation (FIG. 2/S032 . . . YES), the electric power is supplied from the vehicle 1 to the other vehicle through the first electric power supply portion 112 (FIG. 2/S036). On the other hand, when it is determined that the fourth electric power index value $E_4$ is not greater than 0 (FIG. 2/S030 . . . NO) or the fuel cell 11 is not under compulsory electric power generation (FIG. 2/S032 . . . NO), the electric power supply from the vehicle 1 to the other vehicle is not performed or will be stopped (FIG. 2/S038).

According to the fuel cell vehicle 1 exhibiting the above-mentioned functions, the first distance index value $D_1$ representing an available driving distance by the vehicle 1, the first electric power index value $E_1$ representing an available electric power supply of either one or both of the fuel cell 11 and the electric accumulator (the capacitor 12 and the storage cell 16) can be output (refer to FIG. 2/S002 and S004). Specifically, the available electric power supply of the fuel cell 11, the capacitor 12 and the storage cell 16 is displayed on the second indicator $I_2$. The remained fuel amount is displayed on the third indicator $I_3$. The charge amount of the capacitor 12 and the storage cell 16 is displayed on the fourth indicator $I_4$ (refer to FIG. 3).

Thereby, the available electric power supply of the fuel cell 11 and the electric accumulator can be recognized by the driver or the like if necessary according to the available driving distance of the vehicle 1 as the information with high usability for appropriately planning a task such as continuation of driving the vehicle 1 to a desired location in view of the available electric power supply of the fuel cell 11 and the like as the driving power source.

Further, the second distance index value $D_2$ representing a required driving distance for the vehicle 1 to drive from the present position (the first position) $P_1$ to the position of the fuel supply station (the second position) $P_2$ can be output (refer to FIG. 2/S010 and FIG. 3). Thereby, the required driving distance can be recognized by the driver or the like as the information with high usability for planning a task such as refilling fuels in the fuel supply station or the like (refer to FIG. 4).

Furthermore, the second electric power index value $E_2$ representing an available electric power supply from the vehicle 1 to an outer apparatus such as the other vehicle or the like nearby can be output (refer to FIG. 2/S012). The second electric power index value $E_2$ is a numerical datum recognized according to the difference between the first distance index value $D_1$ representing an available driving distance of the vehicle 1 and the second distance index value $D_2$ representing a required driving distance for the vehicle 1 to drive from the present position (the first position) $P_1$ to the position of the fuel supply station (the second position) $P_2$. Thereby, whether the vehicle 1 has surplus electric power to be supplied or how much electric power can be supplied to an outer apparatus nearby can be recognized by the driver or the like as the information with high usability for planning a task such as supplying electric power to the outer apparatus from the vehicle 1 and driving the vehicle 1 to the coming fuel supply station thereafter.

The fourth electric power index value $E_4$ representing a requested electric power supply by an outer apparatus can be output. It is acceptable to output a difference between the fourth electric power index value $E_4$ and the second electric power index value $E_2$ representing an available electric power supply from the vehicle 1 to the outer apparatus. Thereby, how much electric power is requested by an outer apparatus or the like can be recognized by the driver or the like as the information with high usability for planning a task such as supplying electric power to the outer apparatus from the vehicle 1.

Moreover, the third electric power index value $E_3$ representing an available electric power supply from the vehicle 1 to an outer apparatus distant from the vehicle 1 can be output (refer to FIG. 2/S020). The third electric power index value $E_3$ is a numerical datum determined according to the first electric power index value $E_1$ representing an available electric power supply from the fuel cell 11 and the like, or a difference between the first distance index value $D_1$ representing an available driving distance of the vehicle 11 and the third distance index value $D_3$ representing a required driving distance for the vehicle 1 to drive from the present position (the first position) $P_1$ to the position of the fuel supply station (the second position) $P_2$ through the intermediary of the position of an outer apparatus (the third position) $P_3$. Thereby, whether the vehicle 1 has surplus electric power to be supplied or how much electric power can be supplied to an outer apparatus distant from the vehicle 1 can be recognized by the driver or the like as the information with high usability for planning a task such as driving the vehicle 1 to the position of the outer apparatus, supplying electric power to the outer apparatus from the vehicle 1 and driving the vehicle 1 to the coming fuel supply station.

It is acceptable that the first recognition element 211 recognizes the fourth electric power index value $E_4$ representing a requested electric power supply by an outer apparatus distant from the vehicle 1 through communication or the like and the display unit 23 outputs the fourth electric power index value $E_4$ or a difference between the third electric power index value $E_3$ and the fourth electric power index value $E_4$. Thereby, how much electric power is requested by an outer apparatus or the like can be recognized by the driver or the like as the information with high usability for planning a task such as supplying electric power to the outer apparatus from the vehicle 1.

It is acceptable that the first recognition element 211 recognizes the fifth electric power index value $E_5$ representing a total amount of electric power supply from the fuel cell vehicle 1 to the outer apparatus according to a variation in the first electric power index value $E_1$ and the fifth electric power index value $E_1$ is output by the display unit 23. Thereby, how much electric power has been supplied totally to an outer apparatus from the vehicle 1 can be recognized by the driver or the like as the information with high usability for planning a task such as to continue the electric power supply from the vehicle 1 to the outer apparatus or to stop the electric power supply.

We claim:

1. A fuel cell vehicle which is provided with a fuel cell, an electric accumulator, a motor for driving the fuel cell vehicle, and a motor controlling device configured to control the motor by adjusting an electric power supplied to the motor by the fuel cell and the electric accumulator, respectively, the fuel cell vehicle comprising:

a first recognition element configured to calculate a first electric power index value representing an available electric power supply of one or both of the fuel cell and the electric accumulator;

a second recognition element configured to calculate a first distance index value representing an available driving distance of the vehicle according to the first electric power index value and to calculate a second distance index value representing a required driving distance for the vehicle to drive from a first position to a second position according to a recognition result obtained by the position recognition element;

a position recognition element configured to receive a request for electric power supply from an outer apparatus; and an information output device configured to output the first distance index value, or the first distance index value and the first electric power index value, wherein the first recognition element calculates a second electric power index value representing an available electric power supply of the fuel cell vehicle to the outer apparatus according to the first electric power index value and a difference between the first distance index value and the second distance index value, and the second electric power index value is output by the information output device;

a power supply portion connected to at least one of the fuel cell and the storage cell, wherein the outer apparatus comprises an apparatus outside the vehicle, and wherein electric power is supplied to operate the outer apparatus by at least one of the fuel cell and the storage cell from the electric power supply portion; and the position recognition element configured to recognize a present position of the vehicle as a first position and a position of a fuel supply station for the fuel cell as a second position, wherein the second distance index value is output by the information output device, wherein, prior to supplying the electric power to the outer apparatus, the first recognition element calculates a fourth electric power index value representing the requested electric power supply by the outer apparatus, and the fourth electric power index value or a difference between the second electric power index value and the fourth electric power index value is output by the information output device.

2. The fuel cell vehicle according to claim 1 further includes a position recognition element configured to recognize a present position of the vehicle as a first position, a position of a fuel supply station for the fuel cell as a second position and a position of an outer apparatus as a third position, wherein the second recognition element recognizes a third distance index value representing a required driving distance for the vehicle to drive from the first position to the second position through the intermediary of the third position according to a recognition result obtained by the position recognition element, the first recognition element recognizes a third electric power index value representing an available electric power supply of the fuel cell vehicle to the outer apparatus according to the first electric power index value, or the first distance index value and the third distance index value, and the third electric power index value, or the third electric power index value and the third distance index value are output by the information output device.

3. The fuel cell vehicle according to claim 2, wherein the first recognition element recognizes a fourth electric power index value representing a requested electric power supply by the outer apparatus, and the fourth electric power index value or a difference between the third electric power index value and the fourth electric power index value is output by the information output device.

4. The fuel cell vehicle according to claim 1, wherein the first recognition element recognizes a fifth electric power index value representing a total amount of electric power supply from the fuel cell vehicle to the outer apparatus according to a variation in the first electric power index value, and the fifth electric power index value is output by the information output device.

5. The fuel cell vehicle according to claim 1, wherein the first recognition element recognizes a remained fuel amount in a fuel tank mounted in the fuel cell vehicle as the first electric power index value of the fuel cell.

6. The fuel cell vehicle according to claim 1, wherein the first recognition element recognizes a charge amount of the electric accumulator as the first electric power index value of the electric accumulator.

7. The fuel cell vehicle according to claim 1, further comprising:

a first electric accumulator and a second electric accumulator, wherein the power supply portion is connected to the fuel cell or the first electric accumulator and a second power supply portion is connected to the second electric accumulator.

8. The fuel cell vehicle according to claim 1, wherein voltage supplied to the outer apparatus from the power supply portion is higher than the voltage supplied to the outer apparatus from the second power supply portion.

9. The fuel cell vehicle according to claim 1, wherein the outer apparatus supplied power by the power supply portion comprises an electric accumulator installed in other vehicles, and the outer apparatus supplied power by the second power supply portion comprises a television, radio, or lighting device.

10. The fuel cell vehicle according to claim 1, wherein the power supply portion is configured such that a plug of the outer apparatus is plugged into the power supply portion.

* * * * *